United States Patent [19]

Suey

[11] Patent Number: 5,120,477
[45] Date of Patent: Jun. 9, 1992

[54] PREPARING REFRACTORY ARTICLES BY A FREEZECAST PROCESS

[76] Inventor: Paul V. Suey, R.D. #1, Ridge Rd., Sugar Loaf Hill, Natrona Heights, Pa. 15065

[21] Appl. No.: 731,797

[22] Filed: Jul. 17, 1991

[51] Int. Cl.$^5$ .............................................. C04B 41/87
[52] U.S. Cl. ...................................... 264/28; 264/60; 264/62
[58] Field of Search .............................. 264/28, 60, 62

[56] References Cited

U.S. PATENT DOCUMENTS

| | | | |
|---|---|---|---|
| 2,869,215 | 1/1959 | Smith | 264/28 |
| 3,177,161 | 4/1965 | Smith-Johannsen . | |
| 3,512,571 | 5/1970 | Phelps . | |
| 3,816,572 | 6/1974 | Roelofs . | |
| 3,885,005 | 5/1975 | Downing et al. . | |
| 4,174,331 | 11/1979 | Myles . | |
| 4,246,209 | 1/1981 | Smith-Johannsen . | |
| 4,248,752 | 2/1981 | Myles . | |
| 4,341,725 | 7/1982 | Weaver et al. . | |
| 5,047,181 | 9/1991 | Occhionero | 264/28 |

Primary Examiner—James Derrington
Attorney, Agent, or Firm—Armstrong & Kubovcik

[57] ABSTRACT

Refractory articles are prepared by a freezecast process where a ceramic fiber mat is saturated with a colloidal silica aqueous suspension, frozen and then heated to produce a preform. The preform is then saturated with a colloidal silica aqueous suspension, frozen, and then heated to produce a refractory article having silica particles substantially uniformly distributed throughout. The density of the refractory article can be increased by compression of the saturated mat prior to freezing.

17 Claims, No Drawings

PREPARING REFRACTORY ARTICLES BY A FREEZECAST PROCESS

FIELD OF THE INVENTION

The present invention is directed to a process for making shaped refractory articles by a freezecast process.

BACKGROUND OF THE INVENTION

One method for making shaped refractory articles involves preparing an aqueous slurry composed of a colloidal suspension of silica and bulk ceramic fibers. A vacuum is used to pull the slurry from its container and to deposit the same onto a porous mold used to form the shaped article. Excess liquid is withdrawn through the porous mold by the vacuum. The shaped article containing slurry solids and ceramic fibers is then removed from the mold and heated at very high temperatures, resulting in the precipitation of the silica in the form of finely-divided particles within the fibrous matrix.

A major drawback to this system for making shaped refractory articles resides in the fact that, as the porous mold becomes clogged with fibers, the vacuum becomes incapable of withdrawing all of the excess liquid from the mold. In addition, a large amount of the colloidal particles are initially withdrawn with the liquid. It is thus possible to have a nonhomogeneous shaped article with little or no colloidal particles on the surface thereof. However, immediately below the outer surface of the shaped article is material essentially rich in the solid constituents of the slurry. Accordingly, the resulting shaped article does not possess a substantially uniform density throughout and is therefore prone to irregular shrinkage upon drying or heating.

Freezecast processes have also been used to make refractory articles. The following are illustrative of such procedures.

Smith-Johannsen in the U.S. Pat. No. 3,177,161 uses a dispersion containing colloidal silica and a silicophilic material to form the desired structure, freezes the dispersion, permits the frozen structure to thaw, and then evaporates any remaining water from the structure by drying.

In U.S. Pat. No. 3,512,571, Phelps forms a refractory mold by freezing on a pattern, a slurry containing an aqueous colloidal sol and a powdered refractory material and then firing the frozen shape without prior thawing. The firing is carried out at a temperature of 1400° to 1600° F. If desired, Phelps may oven dry to a temperature of 200° to 500° F. before firing.

Roelofs, in U.S. Pat. No. 3,816,572, prepares a form using a composition, such as disclosed in U.S. Pat. No. 3,512,571 referred to above, freezes the same, takes special precautions to avoid frosting, and then fires the resulting form at a temperature of 1500° to 1900° F.

Downing, et al. in U.S. Pat. No. 3,885,005, use a refractory composition containing a silica sol and water to form a mold, freeze the molded product, remove the molded product from the mold, subject the frozen material to an elevated temperature to thaw the ice and to dry the water from the material in order to prevent water from reacting with the surface of the refractory body, and then fire the dried material at a temperature of 2000° to 3500° F.

Myles, in U.S. Pat. Nos. 4,174,331 and 4,248,752 discloses processes wherein he uses a composition containing a liquid vehicle, such as water, ceramic fiber, colloidal silica and an adhesion-enhancing agent to form a refractory shape, and then evaporates water therefrom.

In U.S. Pat. No. 4,246,209, Smith-Johannsen supercools a molded material made from an inorganic particulate or ceramic slurry containing colloidal sol to a temperature where it spontaneously nucleates the slurry, resulting in the formation of a very large number of ice crystals that are consequently very small, thus producing a structure that is uniform throughout. The structures are removed from the mold, thawed, dried in an oven at 120° F. and then fired at a temperature of 1250° F.

Weaver's process in U.S. Patent No. 4,341,725 forms a refractory article from a mixture of a liquid and a powder, freeze drying and then firing. In order to prevent the formation of large crystals of ice, the mixture used contains a hydrogen bond forming compound.

I have previously attempted to prepare refractory articles containing ceramic fibers and silica particles homogeneously throughout the article by a freezecast process where a saturated mat was heated to remove water contained therein, but such articles had stronger interior sections than surface sections, indicating less silica adjacent the surface than in the interior section. I have now found, however, that by forming a preform from a saturated mat and saturating the preform with a colloidal silica suspension, surprising properties are achieved and the surface sections of the mat have increased strength that enables use of the resultant refractory articles in situations where previous mats were not suitable.

It is an object of the present invention to provide a process for the preparation of refractory articles that contain ceramic fibers and silica particles substantially uniformly disposed throughout the article, both at the interior and the surface areas.

SUMMARY OF THE INVENTION

The present invention is a process for preparing a refractory article. A mat composed of ceramic fibers is substantially saturated with an aqueous suspension of colloidal silica and the saturated mat is frozen. The frozen mat is then heated at an elevated temperature until substantially all of the water is removed from the mat to produce a preform. The preform is then substantially saturated with an aqueous suspension of colloidal silica. The saturated preform is then heated at an elevated temperature until substantially all of the water is removed from the preform to produce a refractory article.

The mat can be formed into a desired shape by placing it in a mold prior to freezing the saturated mat. Thicker refractory articles can be formed by using a plurality of saturated mats, stacked one on top of the other prior to the freezing step. The density of the resultant refractory articles can be increased by compressing the saturated mat or mats prior to the freezing step.

Refractory articles formed according to the present invention have colloidal silica particles substantially homogeneously distributed throughout.

DETAILED DESCRIPTION OF THE PREFERRED EMBODIMENTS

The process of the invention first involves the saturation of a ceramic fiber mat with an aqueous colloidal silica suspension.

Suitable ceramic fiber mats used herein can be woven or unwoven as long as the mat retains its integrity during the process described herein. Any type of ceramic fiber can be used to form the mat as long as it can withstand very high temperatures, for example, on the order of 2300° F. Preferred ceramic fibers include those of alumina, aluminum silicate, boron oxide, boron carbide, calcium-aluminum silicate, glass, mineral wool and mixtures thereof. Examples of suitable ceramic fiber mats are those available as FIBERFRAX® mats from the Carborundum Company, as Kaowool® mats from Babcock & Wilcox Company, fiberglass mats from Owens-Corning Fiberglass, or Cerafelt® mats from Johns Mansville. The preferred ceramic fiber mats are those capable of withstanding sustained temperatures on the order of 1600°-2600° F.

The aqueous suspension of colloidal silica used must be freeze-sensitive, in which the silica particles precipitate or coagulate when the suspension is frozen. Such silica suspensions have silica particles therein having an average diameter of between about 10 nanometers and about 25 nanometers and a specific surface area of between about 125 meters squared per gram ($m^2/g$) and 250 ($m^2/g$). Such aqueous colloidal silica suspensions generally contain less than about 50 weight percent colloidal silica and preferably contain less than about 30 weight percent colloidal silica. Suitable aqueous colloidal silica suspensions are available from E.I. du Pont de Nemours & Co., Inc. under the trademark Ludox®, or are available from Nalco AG as colloidal silica, such as 050 Colloidal MTV. Preferred is a colloidal silica suspension available from E.I. du Pont de Nemours & Co., Inc. as Ludox® TM colloidal silica.

The ceramic fiber mat is substantially saturated with an aqueous colloidal silica suspension, i.e., the mat is in contact with the colloidal silica suspension at least until the mat cannot absorb any more of the suspension. Typically, the mat is placed in a flat mold having sidewalls to prevent run-off of the suspension, and the suspension is poured over the mat until the mat is saturated. In addition, the mat can be saturated by passing the mat through a vessel containing the suspension for a sufficient time to saturate the mat. The saturation can be effected at various temperatures and pressures, but is preferably carried out under ambient conditions.

The aqueous colloidal silica suspension is preferably diluted with water. The colloidal silica suspension is a aqueous suspension containing about 30-50 percent by weight water. This suspension is then diluted with water, preferably in about an amount equal to the amount of the suspension. Also, a surfactant or wetting agent may be added to the aqueous suspension of colloidal silica, which surfactant may be added in an amount of about 0.01 to 0.02 percent by weight of the aqueous suspension.

If a flat article is to be produced, the mat is typically placed in a flat mold having the dimensions of the mat and is saturated therein. If a curved shape is desired, the mat, saturated in a flat mold, is removed from the flat mold and placed in a curved mold having the desired shape. If a thicker flat article is to be produced, a second mat can be placed over a first saturated mat in a flat mold and the second mat can then be saturated. Or, a second mat can be separately saturated and placed on top of the first mat. In addition, the saturated mat or mats, when in the appropriate mold can be compressed to achieve a desired thickness and density.

The saturated mat, after being molded to the desired shape is then frozen. Typically, the mats are frozen in their mold to maintain the desired shape during the freezing step.

Generally, the saturated mat is subjected to temperatures below about −20° F. and, preferably to temperatures of between about −25° F. to about −35° F. until the mat is frozen throughout. The saturated mat is preferably exposed to freezing conditions for a time period sufficient to cause the temperature of the center of the mat to be less than −20° F. and, preferably, between about −25° F and −35° F. The saturated mat can be suitably frozen by placing the mat in a freezer, a bath of liquid nitrogen, a bath of liquid carbon dioxide, a bath of cooled liquid ethylene glycol, a bath of alcohol supercooled by passage of liquid carbon dioxide therethrough, or the like. A bath of liquid nitrogen is preferred because freezing would be quickly effected.

The frozen mat is removed from the mold and is heated at an elevated temperature until substantially all of the water is removed from the mat to produce a preform. The mat should be heated at a rate that will remove the residual water, but at temperatures and rates of drying that will prevent any boiling of the water from the mat. Preferably, the mat is subjected to a temperature of between about 250° F. and about 350° F. The mat can be heated by placing it in any type of suitable oven.

The preform, so produced, is then substantially saturated with an aqueous colloidal silica suspension as was carried out with the initial ceramic fiber mat. The saturation of the preform is effected using the processing steps that are used to saturate the initial mat, as hereinbefore described. After saturation, the preform is heated at an elevated temperature until substantially all of the water is removed from the preform to produce a refractory article. As with the initial mat, the heating is effected preferably at a temperature of about 250° F. to about 350° F., at a temperature and rate of drying that prevents boiling of the water from the preform.

The resultant refractory article can have a density that depends upon the colloidal silica suspension used as well as any compression of the saturated mat prior to freezing, but preferably has a density of between about 30-50 pounds per cubic foot. Also, the refractory article contains at least about 60 percent by weight of silica, and preferably at least about 80 percent by weight silica.

EXAMPLE I

As an example of the present process, a refractory board was produced by soaking a 2″ thick ceramic fiber mat (FIBERFRAX 2300) in an aqueous colloidal silica suspension, comprising one part Ludox® TM (50% colloidal silica and 50% water) mixed with one part water, for about 5 minutes until the ceramic fiber mat was saturated. The saturated mat was withdrawn and compressed to a thickness of about 1″. The compressed, saturated mat was immersed in an alcohol bath supercooled by liquid carbon dioxide, which was at a temperature below −30° C., for a period of about 5 minutes. The frozen mat was removed from the cooling bath and heated in an oven at 300° F. for a period of about 45 minutes to produce a preform. The preform was cooled and reimmersed in the aqueous colloidal silica suspension for a period of about 5 minutes, until no further bubbles were released from the mat, and then set aside to drip dry. The preform was then heated at 300° F. for a period of about 45 minutes to produce a refractory board. The refractory board had a density of about 30 pounds per cubic foot.

Strips were cut from the refractory board of a size about 6"×1"×1" which were subjected to modulus of rupture (MOR) testing, using the procedure generally according to ASTM Designation: C583-67 (Reapproved 1972) as Standard Method of Test for Modulus of Rupture of Refractory Materials at Elevated Temperatures. Shrinkage of the refractory board was also tested. The test results are listed in Table I.

TABLE I

| TEMPERATURE (°F.) | MOR lbs./in$^2$ | SHRINKAGE Volume % |
|---|---|---|
| 600 | 286 | 0.05 |
| 1200 | 105 | 0.5 |
| 1400 | 123 | 0.1 |
| 1600 | 213 | 1.1 |
| 1800 | 239 | 6.4 |
| 2000 | 178 | not recorded |

It is surprising to note that, after an initial drop in the MOR value between 600° to 1200° F., the strength of the board as indicated by the MOR increased between about 1200° F. and 2000° F., while at the same time, the shrinkage was exceptionally low.

EXAMPLE II

The procedure for making a refractory board, as in Example I, was repeated, except that a first saturated mat (A) was compressed such that the resultant refractory board had a density of about 40 pounds per cubic foot, and a second saturated mat (B) was compressed such that the resultant refractory board had a density of about 50 pounds per cubic foot. Modulus of rupture testing was carried out at 1400° F. as in Example I, with the results listed in Table II:

TABLE II

| REFRACTORY BOARD | MOR (1400° F.) lbs./in$^2$ |
|---|---|
| A | 928 |
| B | 710 |

A further refractory board produced from bulk ceramic fibers and not a starting mat was produced and tested and gave a value of 450 for the modulus of rupture at 1400° F.

The resulting refractory article, produced by the present process, has very fine silica particles homogeneously distributed throughout the article and has a uniform density of ceramic fibers. Further, the resulting refractory article preferably contains at least about 60 weight percent, and, more preferably, at least about 80 weight percent silica.

What is claimed is:

1. A process for preparing a refractory article comprising:
    forming a mat composed of ceramic fibers into a desired shape;
    substantially saturating said mat with an aqueous suspension of colloidal silica;
    freezing the resultant saturated mat;
    heating the resultant frozen saturated mat at an elevated temperature until substantially all of the water is removed from said mat to produce a preform;
    substantially saturating said preform with an aqueous suspension of colloidal silica; and
    heating the resultant preform at an elevated temperature until substantially all of the water is removed from said preform to produce a refractory article having colloidal silica particles substantially homogeneously distributed throughout.

2. The process of claim 1, wherein said mat is formed into a desired shape by placing it in a mold, said shaped, saturated mat is frozen while still in said mold, and said frozen, shaped mat is removed from said mold prior to heating said frozen, shaped mat.

3. The process of claim 1, wherein a second mat composed of ceramic fibers is saturated with an aqueous colloidal suspension of silica and placed atop said first saturated mat prior to freezing said saturated mats.

4. The process of claim 3, wherein said saturated mats are stacked, placed in a mold and compressed prior to freezing said stacked, compressed mats and said frozen, stacked, compressed mats are removed from said mold prior to heating.

5. The process of claim 1 wherein said colloidal suspension contains up to about 50 weight percent silica.

6. The process of claim 5, wherein said colloidal suspension contains up to about 30 weight percent silica.

7. The process of claim 1, wherein said colloidal silica has an average particle diameter of between about 10 nanometers and 25 nanometers.

8. The process of claim 7, wherein said colloidal silica has a specific surface area of between about 125 m$^2$/g and 250 m$^2$/g.

9. The process of claim 1, wherein said saturated preform contains a sufficient amount of silica such that said finished refractory article contains at least about 60 weight percent silica.

10. The process of claim 9, wherein said preform mat contains a sufficient amount of silica so that said finished refractory article contains at least about 80 weight percent silica.

11. The process of claim 1, wherein said saturated mat is frozen at a temperature below about −25° F.

12. The process of claim 11, wherein said saturated mat is frozen at a temperature of between about −25° F. and about −35° F.

13. The process of claim 1, wherein said frozen mat and said preform are heated at a temperature of between about 250° F. and 350° F.

14. The process of claim 1, wherein said substantially saturated mat is compressed prior to said freezing, such that said finished refractory article has a density of at least about 30 lbs/ft$^3$.

15. The process of claim 14, wherein said substantially saturated mat is compressed prior to said freezing, such that said finished refractory article has a density of at between about 40 to 50 lbs/ft$^3$.

16. A process for preparing a refractory article comprising:
    substantially saturating a mat composed of ceramic fibers with an aqueous suspension of colloidal silica;
    compressing said resultant saturated mat to increase the density thereof;
    freezing the resultant compressed saturated mat;
    heating the resultant frozen saturated mat at an elevated temperature until substantially all of the water is removed from said mat to produce a preform;
    substantially saturating said preform with an aqueous suspension of colloidal silica; and heating the resultant preform at an elevated temperature until substantially all of the water is removed from said preform to produce a refractory article having colloidal silica particles substantially homogeneously distributed throughout, and a density of at least about 30 pounds per cubic foot.

17. The process as defined in claim 16, wherein the density of said refractory article is between about 40-50 pounds per cubic foot.

* * * * *